Nov. 15, 1955 L. TINO Re. 24,089

SUSPENDERS

Original Filed Feb. 19, 1952

INVENTOR.
Louis Tino
BY
Wallenstein & Spangenberg
Attys.

United States Patent Office

Re. 24,089
Reissued Nov. 15, 1955

24,089

SUSPENDERS

Louis Tino, Oak Park, Ill.

Original No. 2,707,285, dated May 3, 1955, Serial No. 272,297, February 19, 1952. Application for reissue September 2, 1955, Serial No. 532,381

4 Claims. (Cl. 2—330)

Matter enclosed in heavy brackets [ ] appears in the original patent but forms no part of this reissue specification; matter printed in italics indicates the additions made by reissue.

This invention relates to suspenders for supporting trousers and the like.

The waists of trousers and the like are usually supplied with buttons for receiving suspenders and with belt loops for receiving a belt for the purpose of suspending the trousers. In some instances the trousers are not supplied with buttons so that conventional suspenders cannot be used therewith. Quite often a trouser button may become loose or be torn away rendering conventional suspenders inoperative for the purpose of suspending the trousers.

The principal object of this invention is to provide improved suspenders wherein they may be readily, quickly and simply attached to either the trouser buttons or the trouser belt loops so that the suspenders may suspend the trousers by the trouser buttons, if they are provided with buttons, or by the trouser belt loops, if they are not provided with buttons, or if any of the buttons have been loosened or torn away, or if it merely be preferable to so suspend the trousers.

In accordance with this invention, the ends of each suspender are provided with a clasp or upwardly facing hook which is constructed to engage under a trouser button and to receive a trouser belt loop for suspending the trousers by either, or both, the trouser buttons or belt loops. The clasp is preferably openable and closable so that it securely engages under the button when it is closed and receives the belt loop when it is opened. Preferably the clasp includes an upwardly facing hook portion having a flattened bottom and a movable closure portion therefor, the movable closure portion facilitating application of the suspenders to the trouser buttons and/or belt loops and also securely holding the same in place when applied thereto. The ends of the suspenders may be provided with a single hook or clasp or with a pair of hooks or clasps. In either case the hooks or clasps may be secured to chain-like members extending through loop portions in the ends of the suspender straps.

Further objects of this invention reside in the details of construction of the suspenders and in the cooperative relationships between the component parts thereof.

Other objects and advantages of this invention will become apparent to those skilled in the art upon reference to the accompanying specification, claims and drawing, in which:

Figure 1:
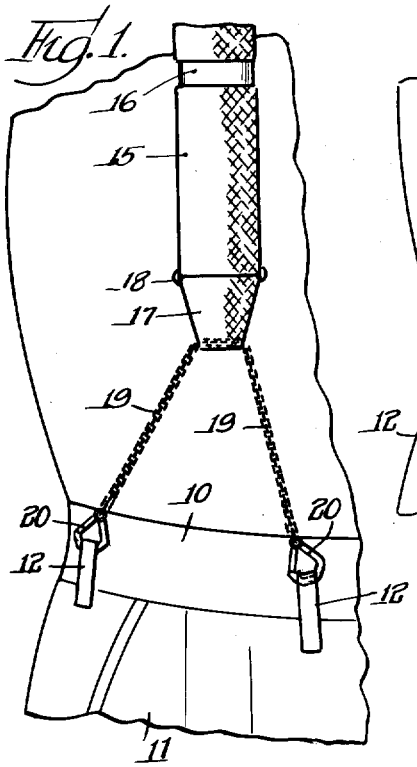
Fig. 1 illustrates one form of the suspenders of this invention applied to the belt loops of a pair of trousers.
Figure 3:
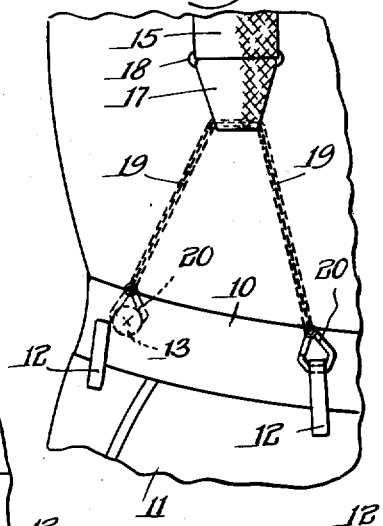
Fig. 3 is a view similar to Fig. 1 but showing the suspenders applied to both the trouser buttons and belt loops.
Figure 2:
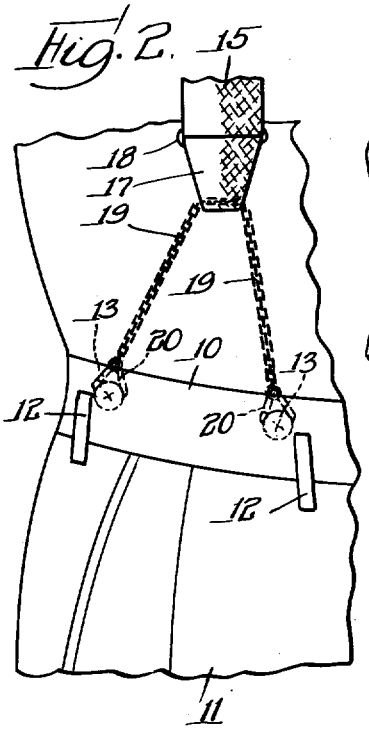
Fig. 2 is a view similar to Fig. 1 but showing the suspenders applied to the trouser buttons.
Figure 6:
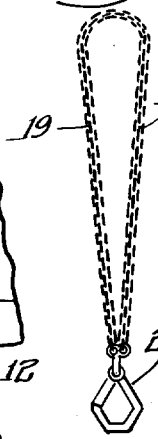
Fig. 6 is an elevational view of the chain-like member and clasp utilized in the form of suspenders illustrated in Figs. 4 and 5.
Figure 7:
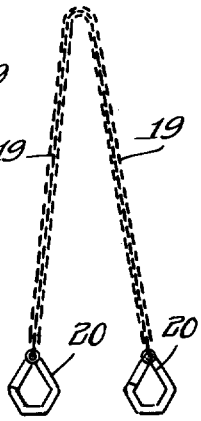
Fig. 7 is an elevational view of the chain-like member and clasps utilized in the form of the invention illustrated in Figs. 1 to 3.

In Figs. 1 to 3 one form of the suspenders of the invention is shown to be applied to the waist portion 10 of a pair of trousers or the like 11 having the usual belt loops 12 and buttons 13. The suspenders have conventional suspender straps 15 which may be made adjustable by means of buckles or clamps 16. The end of the suspender strap 15 carries a loop portion 17 by means of a clip 18. A chain-like member 19, which may be made of metal chain, plastic, leather or the like, extends through, and is carried by, the loop portion 17 and each end of the chain-like portion 19 is provided with a hook or clasp 20. The hooks or clasps 20 are constructed to engage under the trouser buttons 13 and to receive the trouser belt loops 12 for the purpose of suspending the trousers by either the buttons or the belt loops, or both.

Figure 8:
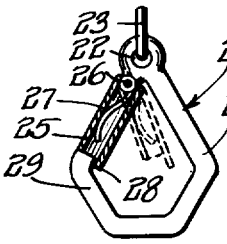
Fig. 8 is an enlarged view of one form of the hook or clasp contemplated by this invention.

While the hook or clasp of this invention may take many forms, a preferred form thereof is generally designated at 20 in Fig. 8. Here the hook or clasp includes a depending body portion 21 provided at its upper end with a hole 22 for receiving a ring 23 for the purpose of securing the hook or clasp in the chain 19. The body portion 21 also preferably includes an upwardly extending hook portion 24 to provide an upwardly facing hook having an opening above the hook portion 24. Preferably a closure portion 25 is utilized for closing the hook. This closure portion 25 is preferably pivoted at 26 to the body portion 21 so that it may be swung to closed position, as indicated in solid lines, or to opened position, as indicated in broken lines. The closure portion is resiliently biased to closed position by a spring 27, the closing movement being limited by an extension 28 on the closure portion 25 engaging the hook portion 24. When the closure portion 25 is closed, the clasp forms a closed loop and when the closure portion 25 is opened, the clasp may readily receive the trouser loops 12 or the thread holding the buttons 13 in place. The size of the hook or clasp is such that it may be readily engaged under a trouser button and when in such position the button, in use, will not work its way through the clasp especially when the clasp is closed. The hook also preferably has a flattened bottom so as to more efficiently fit behind the buttons and receive the belt loops.

In Fig. 1 the clasps 20 are shown to receive the trouser belt loops 12 for the purpose of suspending the trousers. The clasps 20 are readily applied to the belt loops 12 merely by opening the closure portions 25 thereof. When the belt loops 12 are received in the clasps 20 and the closure portions 25 are closed, there is no danger of the clasps being inadvertently disengaged from the belt loops. In Fig. 2 the clasps 20 are shown to be engaging under the trouser buttons 13 for the purpose of suspending the trousers. Here the buttons 13 may be inserted in the clasps 20, just as in the case of conventional button holes, or the clasps may be engaged behind the buttons 13 by opening the closure portions 25 for this purpose. The opening of the closure portions 25 for applying the clasps to the trouser buttons 13 appears to be the simpler method of applying the clasps to the buttons. When the clasps are so applied to the buttons, the buttons are firmly held and inadvertent release of the buttons is substantially impossible. In Fig. 3 one clasp is shown to be applied to a trouser button 13 while the other clasp is shown to be applied to a trouser belt loop 12, the manner of application of each being the same as pointed out above. Here this arrangement may be used where a trouser button is loosened or torn away from the trousers.

Figure 4:
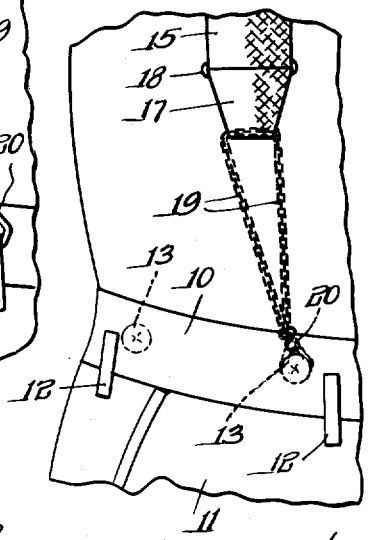
Fig. 4 is a view similar to Fig. 1 but showing another form of suspenders wherein the suspenders are fastened to the trouser buttons.
Figure 5:
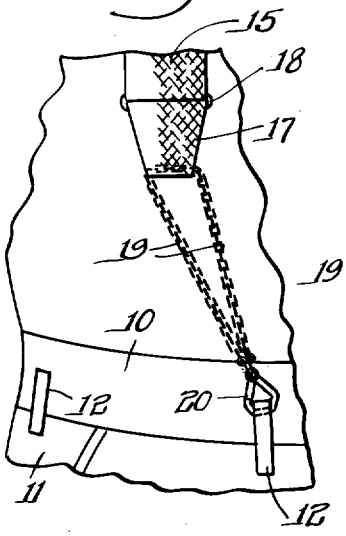
Fig. 5 is a view similar to Fig. 4 but showing the suspenders applied to the trouser belt loops.

In Figs. 4 and 5 there is illustrated another form of suspenders. Here the ends of the chain-like member 19 terminate in, and are secured to, a single clasp 20. The clasp 20 may engage under a trouser button 13, as illustrated in Fig. 4, or it may receive a trouser belt loop 12, as illustrated in Fig. 5. Here the manner of application of the clasp 20 to the trouser button and belt loop are the same as described above.

Thus it is seen that the improved suspenders of this invention may be readily, quickly and simply attached to either the trouser buttons or the trouser belt loops, or both, so that the suspenders may suspend the trousers by the trouser buttons, if they are provided with buttons, or they may be suspended by the trouser belt loops, if the trousers are not provided with buttons, or if any of the buttons have been loosened or torn away, or if it merely be preferable to so suspend the trousers.

While for purposes of illustration two forms of this invention have been disclosed, other forms thereof may become apparent to those skilled in the art upon reference to this disclosure and, therefore, this invention is to be limited only by the scope of the appended claims.

I claim as my invention:

1. In suspenders having a suspender strap with a loop portion at its end and a chain threaded through and carried by the loop portion, the improvement for suspending trousers from buttons or belt loops at the trouser waist, comprising at least one clasp carried by the ends of the chain and including an upwardly facing hook having a flattened bottom portion and a closure member resiliently biased to closed position for normally closing the hook, and adapted to engage under a trouser button and to receive a trouser belt loop, the closure member being temporarily opened for such reception of the belt loop.

2. In suspenders having a suspender strap with a loop portion at its end and a chain threaded through and carried by the loop portion, the improvement for suspending trousers from buttons or belt loops at the trouser waist, comprising a single clasp carried by the ends of the chain and including an upwardly facing hook having a flattened bottom portion and a closure member resiliently biased to closed position for normally closing the hook, and adapted to engage under a trouser button and to receive a trouser belt loop, the closure member being temporarily opened for such reception of the belt loop.

3. In suspenders having a suspender strap with a loop portion at its end and a chain threaded through and carried by the loop portion, the improvement for suspending trousers from buttons or belt loops at the trouser waist, comprising a clasp carried by each end of the chain, each clasp including an upwardly facing hook having a flattened bottom portion and a closure member resiliently biased to closed position for normally closing the hook, and adapted to engage under a trouser button and to receive a trouser belt loop, the closure member being temporarily opened for such reception of the belt loop.

*4. In suspenders having a suspender strap with a loop portion at its end and a chain threaded through and carried by the loop portion, the improvement for suspending trousers from buttons or belt loops at the trouser waist, comprising at least one clasp carried by the ends of the chain and having open and closed positions and including an upwardly facing hook having a flattened bottom portion, and a closure member movably carried by said hook and movable by hand between open and closed positions, said hook being adapted to engage under a trouser button and to receive a trouser belt loop, the closure member being temporarily opened for such reception of the belt loop.*

References Cited in the file of this patent or the original patent

UNITED STATES PATENTS

| | | |
|---|---|---|
| Re. 3,492 | Greely | June 8, 1869 |
| 230,289 | Laffite | July 20, 1880 |
| 359,366 | Sisson | Mar. 15, 1887 |
| 1,664,345 | Belden | Mar. 27, 1928 |
| 2,132,887 | Wells | Oct. 11, 1938 |